US012246534B2

(12) United States Patent
Yoshino et al.

(10) Patent No.: US 12,246,534 B2
(45) Date of Patent: Mar. 11, 2025

(54) LIQUID DROPLET EJECTING DEVICE

(71) Applicant: BROTHER KOGYO KABUSHIKI KAISHA, Nagoya (JP)

(72) Inventors: Takaaki Yoshino, Nagoya (JP); Toru Kakiuchi, Chita (JP); Taisuke Mizuno, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 178 days.

(21) Appl. No.: 18/182,455

(22) Filed: Mar. 13, 2023

(65) Prior Publication Data

US 2024/0246335 A1 Jul. 25, 2024

(30) Foreign Application Priority Data

Jan. 25, 2023 (JP) ................................ 2023-009099

(51) Int. Cl.
*B41J 2/045* (2006.01)

(52) U.S. Cl.
CPC ........ *B41J 2/04581* (2013.01); *B41J 2202/10* (2013.01)

(58) Field of Classification Search
CPC ........................ B41J 2/04581; B41J 2/14233; B41J 2202/10; B41J 2/04588
See application file for complete search history.

(56) References Cited

U.S. PATENT DOCUMENTS

| | | | | |
|---|---|---|---|---|
| 9,944,070 | B1 | 4/2018 | Howkins et al. | |
| 12,059,893 | B2 * | 8/2024 | Jackson | B41J 2/04551 |
| 2009/0309908 | A1 * | 12/2009 | Basarah | B41J 2/14201 347/10 |

FOREIGN PATENT DOCUMENTS

| | | |
|---|---|---|
| JP | 2002-264333 A | 9/2002 |
| JP | 2018-130953 A | 8/2018 |

* cited by examiner

*Primary Examiner* — Thinh H Nguyen
(74) *Attorney, Agent, or Firm* — Merchant & Gould P.C.

(57) ABSTRACT

A liquid droplet ejecting device includes a channel member and an actuator. The channel member has a channel. The channel includes a nozzle and a pressure chamber communicating with the nozzle. The actuator is on the channel member and configured to apply a pressure to a liquid in the pressure chamber. A diameter of the nozzle and a natural frequency of the channel are parameters of the liquid droplet ejecting device to satisfy that (1) the actuator has a threshold drive frequency of 100 kHz or more, (2) the nozzle ejects a liquid droplet having a volume of 1.8 pl or more, and (3) the Ohnesorge number is 0.2 or more.

7 Claims, 9 Drawing Sheets

FIG. 7

| No | NOZZLE DIAMETER D | NATURAL FREQUENCY Fr | PINCH-OFF TIME Tp | VOLUME OF INK DROPLET | THRESHOLD DRIVE FREQUENCY |
|---|---|---|---|---|---|
| | μm | kHz | μsec | pl | kHz |
| 1 | 14 | 269.76 | 8.62 | 0.95 | 147.87 |
| 2 | 14 | 171.11 | 12.43 | 1.67 | 105.18 |
| 3 | 14 | 134.04 | 15.13 | 2.06 | 87.73 |
| 4 | 14 | 115.88 | 17.01 | 2.29 | 78.77 |
| 5 | 14 | 103.41 | 18.64 | 2.47 | 72.42 |
| 6 | 18 | 305.72 | 8.57 | 1.34 | 144.16 |
| 7 | 18 | 190.70 | 12.32 | 2.35 | 103.08 |
| 8 | 18 | 146.61 | 15.08 | 2.90 | 85.66 |
| 9 | 18 | 125.43 | 17.01 | 3.23 | 76.80 |
| 10 | 18 | 111.83 | 18.58 | 3.47 | 70.89 |
| 11 | 22 | 338.81 | 10.18 | 1.52 | 114.92 |
| 12 | 22 | 210.97 | 13.32 | 2.82 | 91.33 |
| 13 | 22 | 159.79 | 15.60 | 3.57 | 80.21 |
| 14 | 22 | 134.80 | 17.18 | 4.03 | 74.24 |
| 15 | 22 | 119.43 | 18.40 | 4.35 | 70.35 |

FIG. 8

| INK VISCOSITY $\mu$ | INK SURFACE TENSION $\sigma$ | INK DENSITY $\rho$ | NOZZLE DIAMETER D | OHNESORGE NUMBER Oh |
|---|---|---|---|---|
| mPa·s | mN/m | g/cm³ | $\mu$m | |
| 4.3 | 24 | 1 | 19.5 | 0.199 |
| 4.3 | 24 | 1 | 19 | 0.201 |
| 4.3 | 24 | 1 | 18.5 | 0.204 |
| 4.3 | 24 | 1 | 18 | 0.207 |
| 4.3 | 24 | 1 | 17.5 | 0.210 |
| 4.3 | 24 | 1 | 17 | 0.213 |
| 4.3 | 24 | 1 | 16.5 | 0.216 |
| 4.3 | 24 | 1 | 16 | 0.219 |
| 4.3 | 24 | 1 | 15.5 | 0.223 |
| 4.3 | 24 | 1 | 15 | 0.227 |

LIQUID DROPLET EJECTING DEVICE

REFERENCE TO RELATED APPLICATIONS

This application claims priority from Japanese Patent Application No. 2023-009099 filed on Jan. 25, 2023. The entire content of the priority application is incorporated herein by reference.

BACKGROUND ART

A known inkjet head includes an ink channel. The ink channel includes a nozzle, a pressure chamber communicating with the nozzle, and a piezoelectric actuator. In the ink jet head, the piezoelectric actuator generates a pressure in the pressure chamber to eject a liquid droplet from the nozzle.

In general, to achieve high-speed recording, liquid droplet ejecting devices use a high drive frequency to eject a sufficient amount of a liquid droplet for recording. There is disclosed a method of increasing a drive frequency by focusing on an influence of pressure resonance generated in a pressure chamber.

DESCRIPTION

At a drive frequency as high as 100 kHz, a droplet may be ejected before the tail or trailing droplet portion of the previous droplet separates from the meniscus at the nozzle. The droplet may be connected to the tail of the previous droplet, resulting in a combined ink droplet of the droplet and the previous droplet.

Such connection between droplets can be reduced by shortening a pinch-off time. The pinch-off time refers to a time from a time point at which a drive signal related to droplet ejection is applied to the actuator to a time point at which the tail of the droplet separates from the meniscus at the nozzle. The inventors of the present application have found that, as means for shortening the pinch-off time, it is effective to reduce the diameter of the nozzle and to increase a natural frequency of the channel.

However, as the diameter of the nozzle decreases, the amount of a droplet ejected from the nozzle decreases. To increase the natural frequency, the actuator is intended to have high rigidity. When the rigidity of the actuator is high, a large amount of energy is used to deform the actuator to eject a desired amount of a liquid droplet. To maintain the durability of the actuator, a large amount of energy exceeding a predetermined value cannot be applied to the actuator.

In addition, stable ejection may be achieved by reducing not only connection between droplets as described above but also the generation of satellite droplets. The satellite droplets result from separating the tail of the droplet from the main droplet portion. A satellite droplet is smaller in volume than the main droplet portion.

An object of the present disclosure is to provide a liquid droplet ejecting device configured to stably eject liquid droplets each having a sufficient amount for recording at a high drive frequency.

According to an aspect of the disclosure, a liquid droplet ejecting device includes a channel member having a channel, and an actuator on the channel member. The channel includes a nozzle and a pressure chamber communicating with the nozzle. The actuator is configured to apply a pressure to a liquid in the pressure chamber. A diameter of the nozzle and a natural frequency of the channel are parameters of the liquid ejecting device to satisfy the following (1), (2), and (3).

(1) The actuator has a threshold drive frequency of 100 kHz or more.

(2) A droplet of the liquid has a volume of 1.8 pl or more.

(3) The Ohnesorge number is 0.2 or more.

By satisfying the requirements (1) and (2), it is possible to eject liquid droplets each having a sufficient amount for recording at a high drive frequency. Further, the threshold drive frequency is inversely proportional to the pinch-off time. The higher the threshold drive frequency, the shorter the pinch-off time. Therefore, in the requirement (1), the pinch-off time when the threshold drive frequency is equal to or higher than 100 kHz is a value at which the connection of the droplets does not occur. Further, by satisfying the requirement (3), the trailing droplet portion of the droplet is not separated from the main droplet, and the satellite droplet is not generated.

FIG. 7 is a table showing the relationship among the diameter D of the nozzle, the natural frequency Fr, the pinch-off time Tp, the volume of an ink droplet, and the threshold drive frequency.

FIG. 8 is a table showing the relationship among the viscosity of the ink, the surface tension of the ink, the density of the ink, the diameter D of the nozzle, and the Ohnesorge number Oh.

OVERALL CONFIGURATION OF PRINTER 100

Figure 1:
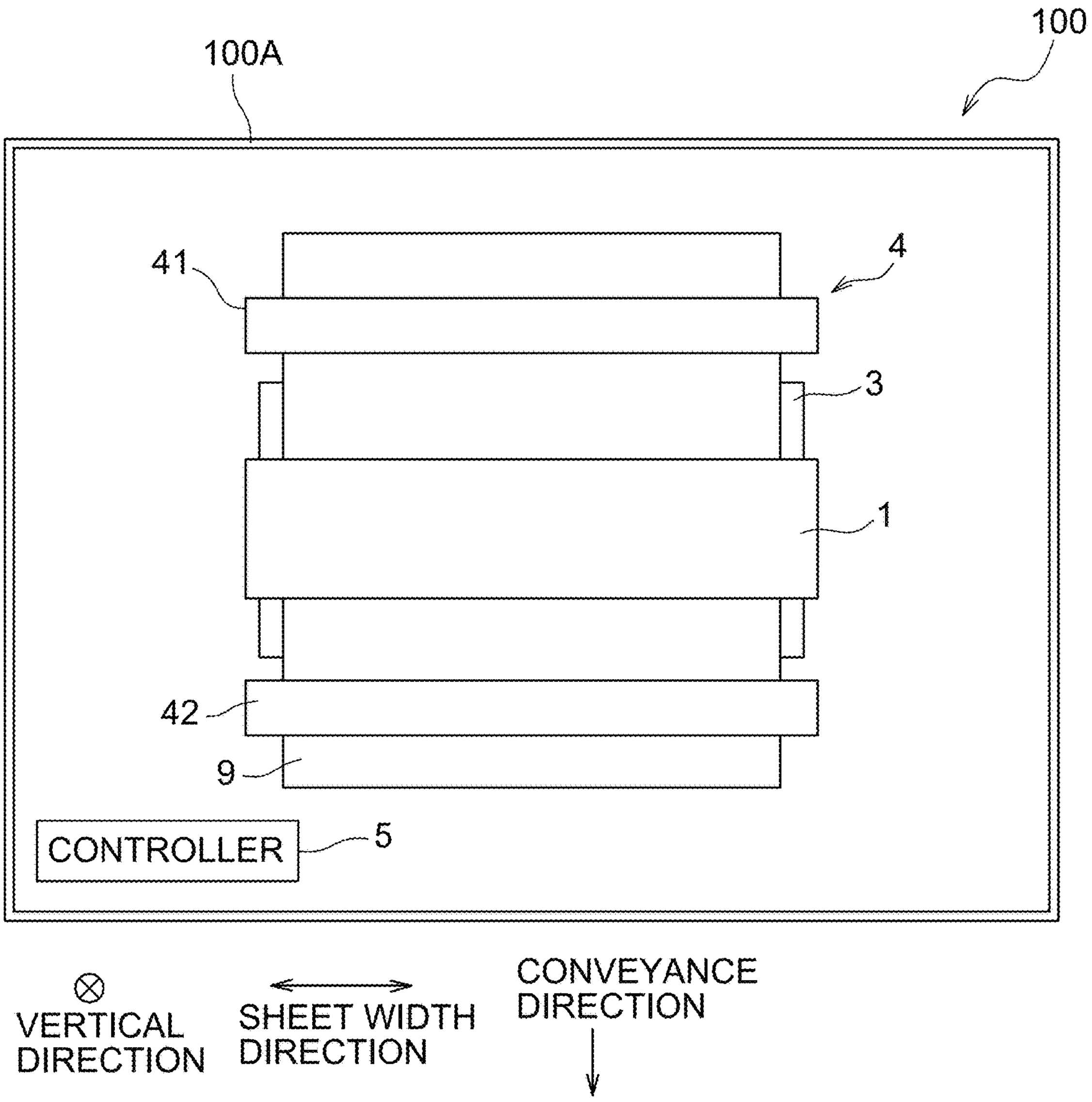
FIG. 1 is a plan view of a printer 100 according to an embodiment of the disclosure.

As illustrated in FIG. 1, a printer 100 according to an embodiment of the present disclosure includes a housing 100A, a head 1, a platen 3, a conveyance mechanism 4, and a controller 5. The head 1, the platen 3, the conveyance mechanism 4, and the controller 5 are disposed in the housing 100A. The printer 100 further includes an input unit including buttons arranged on an outer surface of the housing 100A.

A conveyance direction is a direction in which the conveyance mechanism 4 conveys a sheet 9. A sheet width direction is orthogonal to the conveyance direction. The conveyance direction and the sheet width direction are orthogonal to the vertical direction.

The head 1 is longer in the sheet width direction than in the conveyance direction. The head 1 is configured to eject a liquid, for example, ink, in droplets. The head 1 has a line-type configuration. That is, droplets of ink are ejected from the head 1 onto the sheet 9 while the head 1 is fixed with respect to the housing 100A.

The platen 3 is disposed below the head 1. The sheet 9 is supported on the upper surface of the platen 3.

Figure 2:
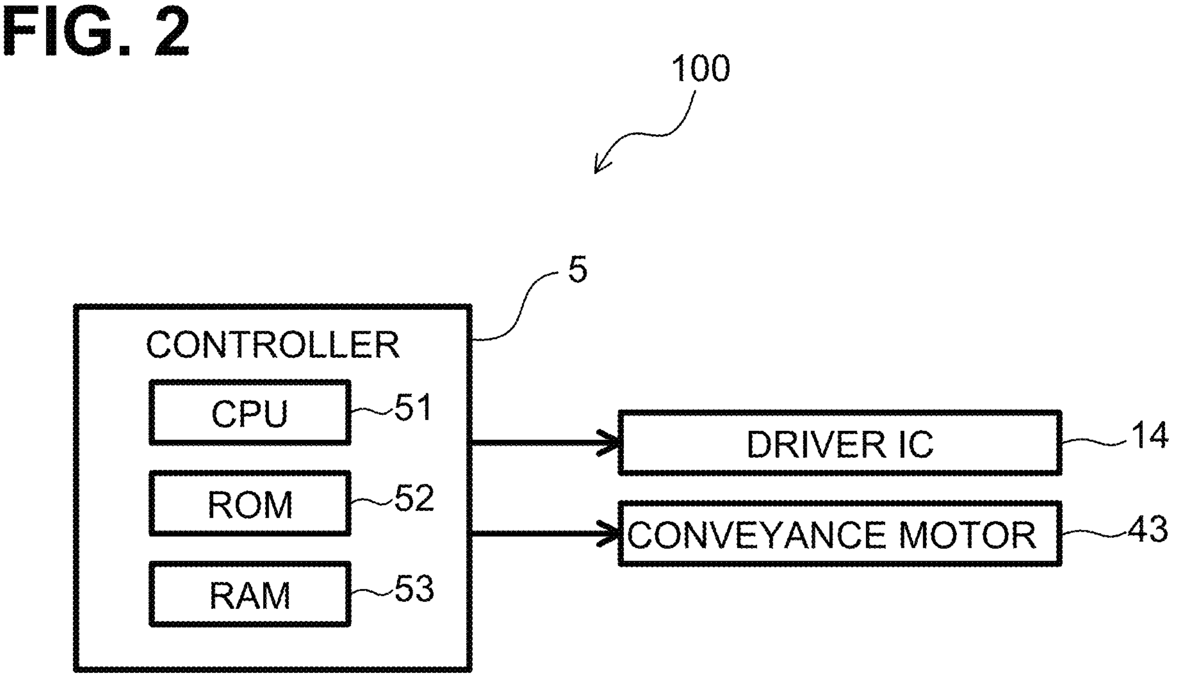
FIG. 2 is a block diagram showing an electrical configuration of the printer 100.

The conveyance mechanism 4 includes roller pairs 41 and 42 and a conveyance motor 43 illustrated in FIG. 2. The roller pairs 41 and 42 are disposed between the head 1 and the platen 3 in the conveyance direction. When the conveyance motor 43 is driven under the control of the controller 5, rollers of the roller pairs 41,42 rotate. When the rollers of the roller pairs 41,42 rotate in a state where the roller pair 41 nips the sheet 9 and the roller pair 42 nips the sheet 9, the sheet 9 is conveyed in the conveyance direction.

As illustrated in FIG. 2, the controller 5 includes CPU 51, ROM 52, and RAM 53.

CPU 51 executes various controls in accordance with programs and instructions stored in ROM 52 and RAM 53 based on the data inputted from the input unit and an external device. The external device is, for example, a PC.

ROM 52 stores programs and data for CPU 51 to perform various controls. RAM 53 temporarily stores data used when CPU 51 executes a program.

Configuration of Head 1

Figure 3:
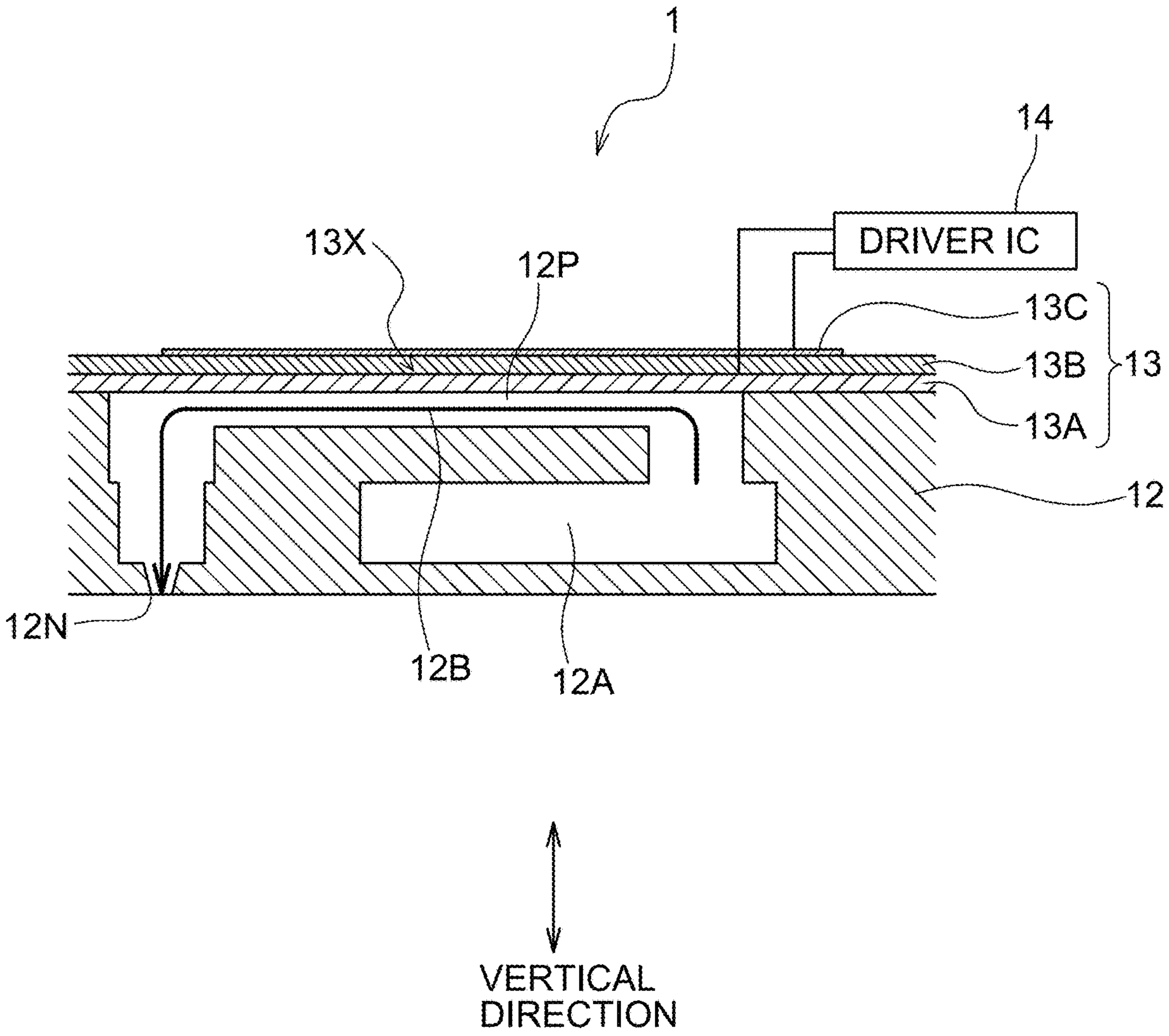
FIG. 3 is a cross-sectional view of a head 1 included in the printer 100.

As illustrated in FIG. 3, the head 1 includes a channel member 12 and an actuator member 13.

The channel member 12 includes a common channel 12A and an individual channel 12B. The common channel 12A communicates with an ink tank and the individual channel 12B. The individual channel 12B includes a nozzle 12N and a pressure chamber 12P communicating with the nozzle 12N. The individual channel 12B corresponds to the "channel".

The ink flows through the common channel 12A into the individual channel 12B, flows via the pressure chamber 12P to the nozzle 12N in the individual channel 12B, and is ejected as an ink droplet from the nozzle 12N.

The nozzle 12N is open in the lower surface of the channel member 12. The pressure chamber 12P is open in the upper surface of the channel member 12. In a plane orthogonal to the vertical direction, the opening of the nozzle 12N has a substantially circular shape, and the opening of the pressure chamber 12P has a substantially rectangular shape.

A plurality of individual channels 12B may be in the channel member 12.

As illustrated in FIG. 4, the actuator member 13 is fixed to the upper surface of the channel member 12. The actuator member 13 is a thin film piezoelectric element, which is a micro electromechanical systems (MEMS) device. The actuator member 13 includes a metallic diaphragm 13A, a piezoelectric layer 13B, and individual electrode 13C. The actuator member 13 has a thin film of the piezoelectric layer 13B on the upper surface of the diaphragm 13A, and has a thin film of the individual electrode 13C on the upper surface of the piezoelectric layer 13B.

The diaphragm 13A is disposed on the upper surface of the channel member 12 covering the pressure chamber 12P. The piezoelectric layer 13B is disposed on the upper surface of the diaphragm 13A. The individual electrode 13C is disposed on the upper surface of the piezoelectric layer 13B and overlaps the pressure chamber 12P in the vertical direction.

A portion of the diaphragm 13A and the piezoelectric layer 13B sandwiched between the individual electrode 13C and the pressure chamber 12P functions as an actuator 13X. The actuator 13X is deformable in accordance with electric potential applied to the individual electrode 13C.

A plurality of actuators 13X may be in the actuator member 13.

The diaphragm 13A and the individual electrode 13C is electrically connected to the driver IC 14. The driver IC 14 maintains the diaphragm 13A at the ground potential and changes the potential of the individual electrode 13C. The diaphragm 13A may be a common electrode that is common to the plurality of actuators 13X.

Figure 5:
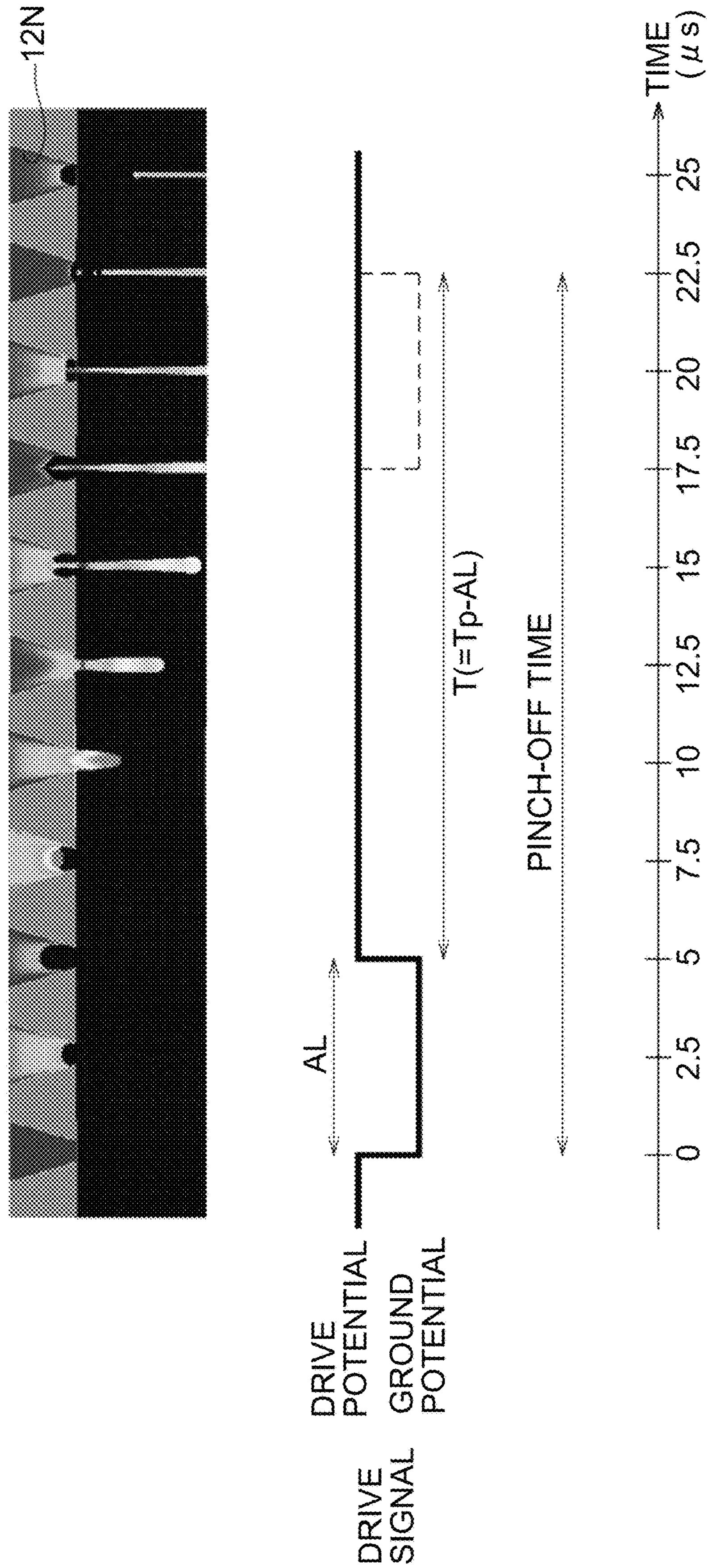
FIG. 5 shows the relationship between a drive signal applied to an actuator 13X and an ink droplet ejected from the nozzle 12N.

The driver IC 14 generates drive signal illustrated in FIG. 5 based on a control signal from the controller 5 and sends the drive signal to the individual electrode 13C. The drive signal causes the potential of the individual electrode 13C to be switched between a predetermined drive potential and the ground potential.

Driving Method of Actuator 13X

In the present embodiment, a "pull-ejection method" is adopted as a driving method of the actuator 13X. In the "pull-ejection method", ink droplets are ejected from the nozzle 12N by increasing the volume of the pressure chamber 12P from a predetermined volume and then decreasing the volume to the predetermined volume or less.

Deformation of the actuator 13X in an ejection cycle will be described. The ejection cycle is a cycle of the drive signal for ejecting one ink droplet of a predetermined size from the nozzle 12N. In the following description, an in-plane direction refers to a direction parallel to the upper surface of the diaphragm 13A.

In the initial state, a drive potential is applied to the individual electrode 13C. At this time, the actuator 13X contracts in the in-plane direction and is deformed to be convex toward the pressure chamber 12P. Then, when the ground potential is applied to the individual electrode 13C, the contraction of the actuator 13X in the in-plane direction is released and the actuator 13X becomes flattened. At this time, the volume of the pressure chamber 12P has been increased since the initial state. The increased volume causes a negative pressure inside the pressure chamber 12P so that the ink is sucked from the common channel 12A to the individual channel 12B.

Thereafter, when the drive potential is applied to the individual electrode 13C, the actuator 13X contracts again in the in-plane direction and is deformed to be convex toward the pressure chamber 12P. At this time, the volume of the pressure chamber 12P has been decreased from the increased volume. The decreased volume causes a positive pressure inside the pressure chamber 12P to pressurize the ink in the pressure chamber 12P so that the ink droplet is ejected from the nozzle 12N.

In the "pull-ejection method", a negative pressure wave is generated in the pressure chamber 12P when the potential of the individual electrode 12C is switched from the drive potential to the ground potential and the volume of the pressure chamber 12P increases. Thereafter, the potential of the individual electrode 13C is switched from the ground potential to the drive potential when the negative pressure wave is reversed to a positive pressure wave, which is in turn applied to the pressure chamber 12P. At this time, since the volume of the pressure chamber 12P decreases, another positive pressure wave is generated in the pressure chamber 12P, and these positive pressure waves are superimposed. Due to the superimposed pressure waves, a large pressure is applied to the ink in the pressure chamber 12P.

As illustrated in FIG. 5, the width of a pulse in the drive signal is equal to the Acoustic Length (AL). AL is the one-way propagation time of the pressure wave in the individual channel 12B. The width of the pulse is set to be half of the reciprocal of the natural frequency of the individual channel 12B. The natural frequency is set to a value, for example, within a range between 101.6 and 340.5 kHz (kilohertz).

State of Ink Droplet 90 Ejected from Nozzle 12N

Figure 4A:
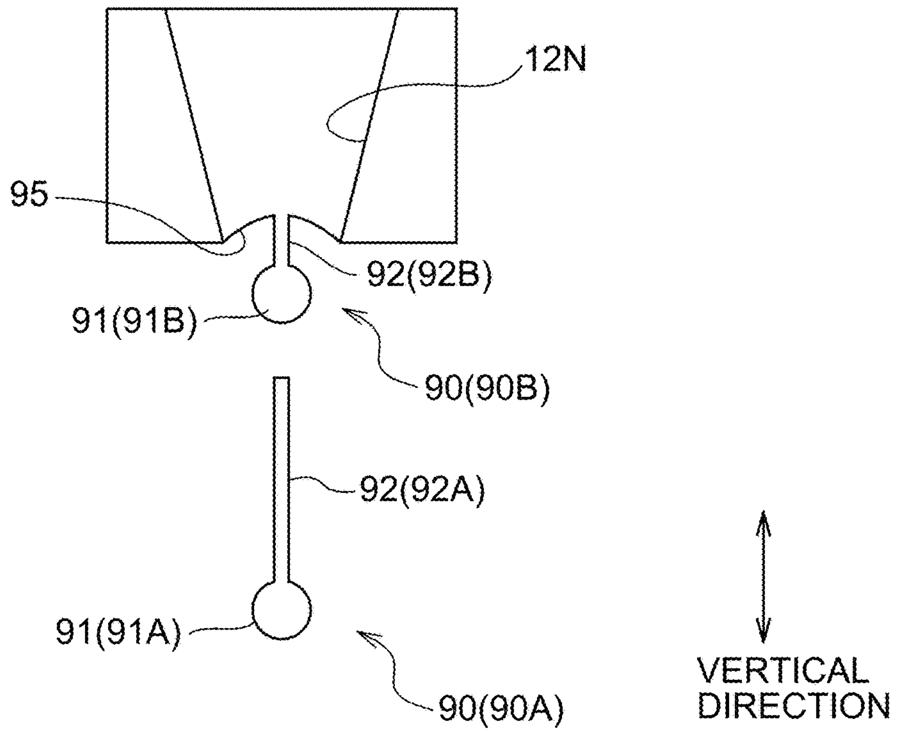
FIG. 4A illustrates that a following ink droplet 90B is being ejected after a trailing droplet portion 92A of an ink droplet 90A separates from a meniscus 95 at a nozzle 12N.

As illustrated in FIG. 4A, an ink droplet 90 includes a leading droplet portion 91, which may be spherical, and a trailing droplet portion 92, which may be a thin columnar tail. The trailing droplet portion 92 extends from the leading droplet portion 91. The trailing droplet portion 92 is separated from a meniscus 95 at the nozzle 12N after a certain period of time has elapsed since the application of a pulse to the individual electrode 13C.

In FIG. 4A, the trailing droplet portion 92A of the ink droplet 90A is separated from the meniscus 95 before the following ink droplet 90B is ejected. In this case, the ink droplet 90A is separate from the following ink droplet 90B.

Figure 4B:
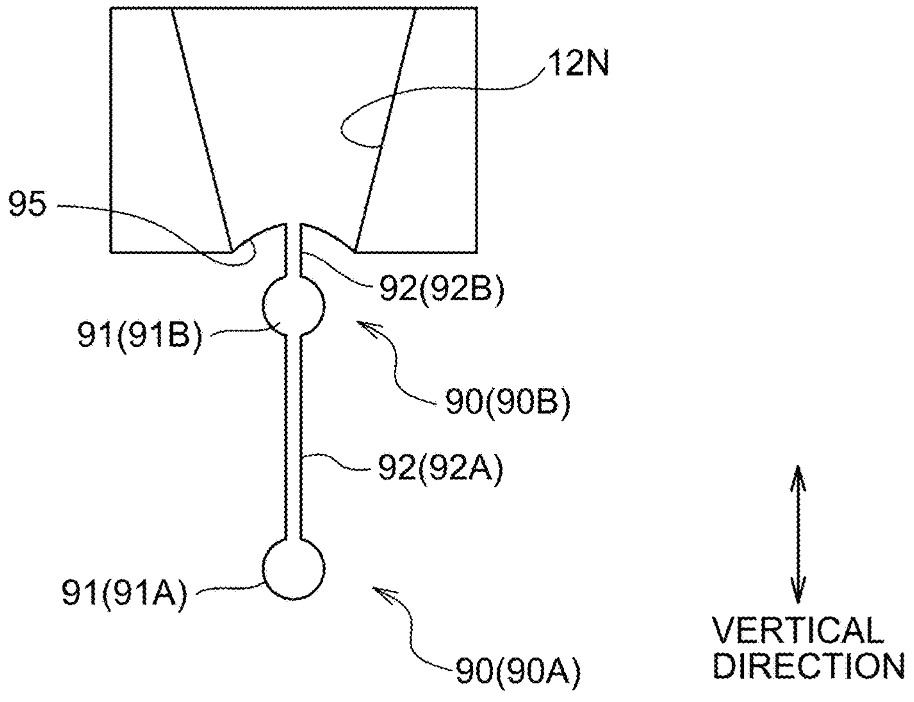
FIG. 4B illustrates that the following ink droplet 90B is connected to the trailing droplet portion 92A of the ink droplet 90A.

In FIG. 4B, the following ink droplet 90B is ejected before the trailing droplet portion 92A of the ink droplet 90A separates from the meniscus 95. As a result, the following ink droplet 90B is connected to the trailing droplet portion 92A of the ink droplet 90A.

The design value of dot size of the ink droplet 90 landed on the sheet 9 is determined under the assumption that the ink droplet 90A is separated from the following ink droplet 90B. Similarly, the design value of the landing position of the ink droplet 90 on the sheet 9 is determined under the assumption that the ink droplet 90A is separated from the following ink droplet 90B.

In the case illustrated in FIG. 4B, a combined ink droplet of the ink droplet 90A and the following ink droplet 90B lands on the sheet 9. Therefore, the dot size is greater than the design value of dot size.

Further, in the case illustrated in FIG. 4B, the weight of the combined ink droplet of the ink droplet 90A and the following ink droplet 90B is greater than the weight of the ink droplet 90A illustrated in FIG. 4A, and thus the flying speed of the combined ink droplet is high. Therefore, the actual landing position of the combined ink droplet of the ink droplet 90A and the following ink droplet 90B deviates from the design value of the landing position.

In FIG. 4A, since the ink droplet 90A is separated from the following ink droplet 90B, the dot size and the landing position are as designed.

In the ejection cycle, a period of time from a time when the drive signal is applied to the actuators 13X to a time when the trailing droplet portion 92 is separated from the meniscus 95 is referred to as a "pinch-off time". The time when the drive signal is applied to the actuator 13X refers to a time when the potential of the drive signal is switched from the drive potential to the ground potential.

In the example illustrated in FIG. 5, the time when the potential of the drive signal is switched from the drive potential in the initial state to the ground potential is set to 0 μs (microseconds), and the potential of the drive signal is switched from the ground potential to the drive potential at 5 μs. That is, the pulse width of the drive signal is 5 μs. Then, at 22.5 μs, the trailing droplet portion 92 of the ink droplet 90 is separated from the meniscus 95. That is, the pinch-off time Tp is 22.5 μs.

For example, when two ink droplets are continuously ejected from the nozzle 12N, the ejection cycle for the second droplet or the following ejection cycle is after the ejection period for the first droplet or the preceding ejection cycle.

When the time when the potential of the drive signal is switched from the ground potential to the drive potential in the following ejection cycle is before the end of the pinch-off time Tp in the preceding ejection cycle, the second ink droplet is connected to the first ink droplet as illustrated in FIG. 4B. When the time when the potential of the drive signal is switched from the ground potential to the drive potential in the following ejection cycle is after the end of the pinch-off time Tp in the preceding ejection cycle, the second ink droplet is not connected to the first ink droplet as illustrated in FIG. 4A.

Here, a broken line in FIG. 5 indicates a condition that the time when the potential of the drive signal is switched from the ground potential to the drive potential in the following ejection cycle is set at the end of the pinch-off time Tp in the preceding ejection cycle. The frequency of the drive signal that satisfies the condition is the highest drive frequency to eject the preceding ink droplet 90 separated from the following ink droplet 90. The highest drive frequency is 1/T where the T represents the drive signal period that is Tp−AL. The highest drive frequency may be referred to as "threshold drive frequency". In other words, if the condition above is satisfied, a time interval between a time to eject the preceding ink droplet 90 and a time to eject the following ink droplet 90 is minimal.

Thus, the shorter pinch-off time Tp may result in both the higher drive frequency and the single ink droplet 90 that is not connected to another ink droplet. The inventors have found that the pinch-off time Tp depends on the diameter D of the nozzle 12N and the natural frequency Fr of the individual channel 12B. The natural frequency Fr is determined at least by the rigidity of the actuator 13X and the shape and size of the pressure chamber 12P.

Figure 6:
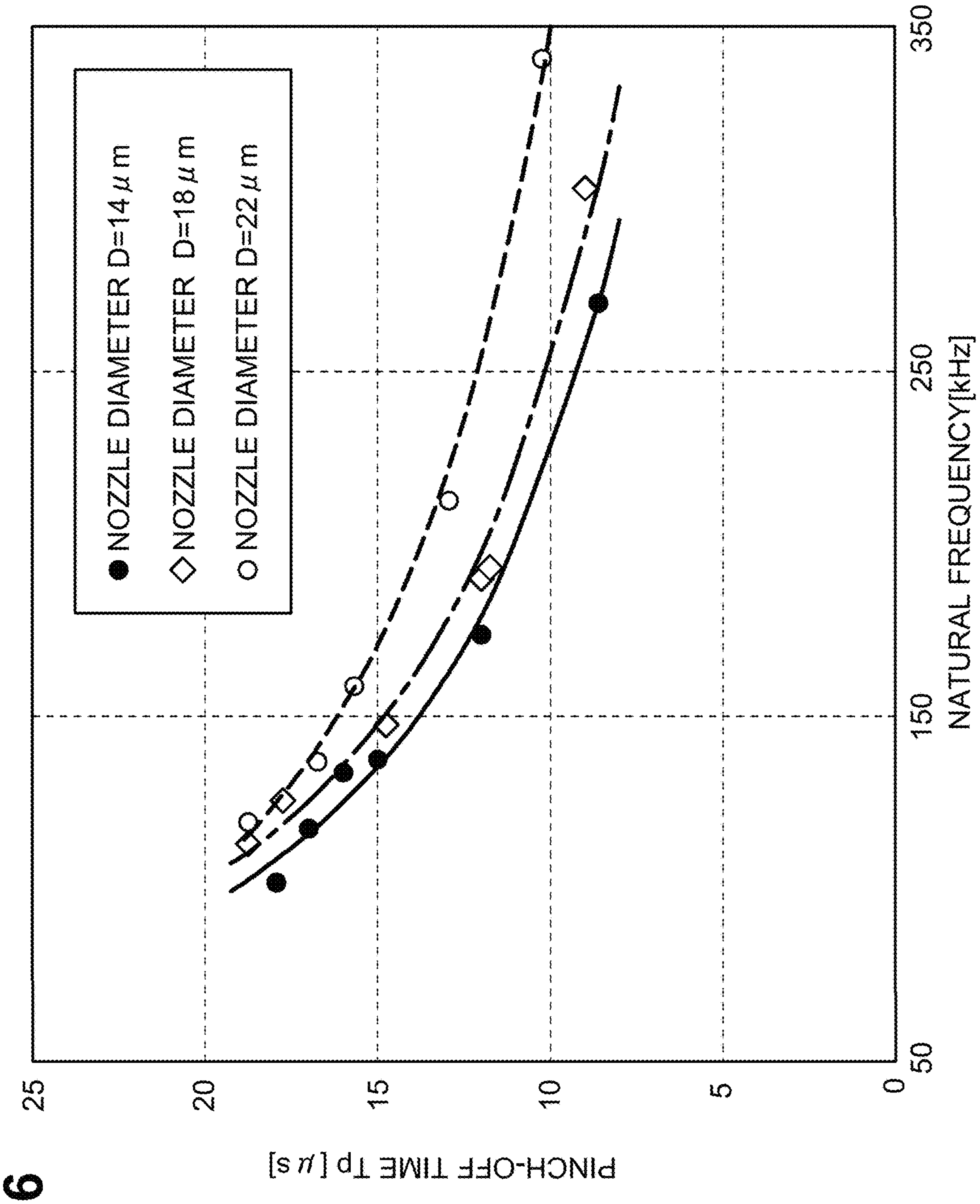
FIG. 6 is a diagram showing the relationship among a nozzle diameter D, a natural frequency Fr, and a pinch-off time Tp.

The plots in FIG. 6 represent values obtained by calculating the pinch-off time Tp while varying the natural frequency Fr for models of the diameter D of the nozzle 12N at 14 μm, 18 μm, and 22 μm. FIG. 6 indicates that the pinch-off time Tp decreases as the diameter D decreases and as the natural frequency Fr increases.

FIG. 7 shows the relationship among the diameter D of the nozzle 12N, the natural frequency Fr, the pinch-off time Tp, the volume of the ink droplet 90, and the threshold drive frequency derived based on the values in FIG. 6 and the following conditions. The volume of the ink droplet 90 is the volume of ink ejected in one ejection cycle and is calculated by simulation. Samples Nos. 1 to 15 each have a particular parameter of drive potential. To calculate the volume of ink droplet 90, approximation is performed with a parameter of the particular drive potential that causes the ink droplet 90 to be ejected at the initial speed 10 m/s.

The conditions are as follows. The viscosity of the ink is about 4 mPa·s (millipascal seconds). The surface tension of the ink is about 34 mN/m (millinewton per meter). The three models of the nozzle 12N each have a diameter D of 14 μm, 18 μm, or 22 μm. FIG. 6 indicates the pinch-off time Tp of the three models. The natural frequency Fr is within a range between 101.6 and 340.5 kHz. The drive signal is of the pull-ejection method illustrated in FIG. 5. The pulse width AL of the drive signal is 1/(2×Fr). The threshold drive frequency is 1/(Tp−AL).

FIG. 8 shows the Ohnesorge number Oh when the diameter D of the nozzle 12N varies from 15 μm to 19.5 μm, where the viscosity of the ink is 4.3 mPa·s, the surface tension of the ink is 24 mN/m, and the density of the ink is 1 g/cm$^3$. As the Ohnesorge number Oh increases, mist is likely to be produced due to Rayleigh-Taylor instability. As the Ohnesorge number Oh decreases, satellite droplets are likely to be produced. Specifically, when the Ohnesorge number Oh is less than 0.2, satellite droplets are likely to be produced. FIG. 8 indicates that the Ohnesorge number Oh is less than 0.2 when the diameter D is more than 19 μm so that satellite droplets are likely to be produced.

Figure 9:
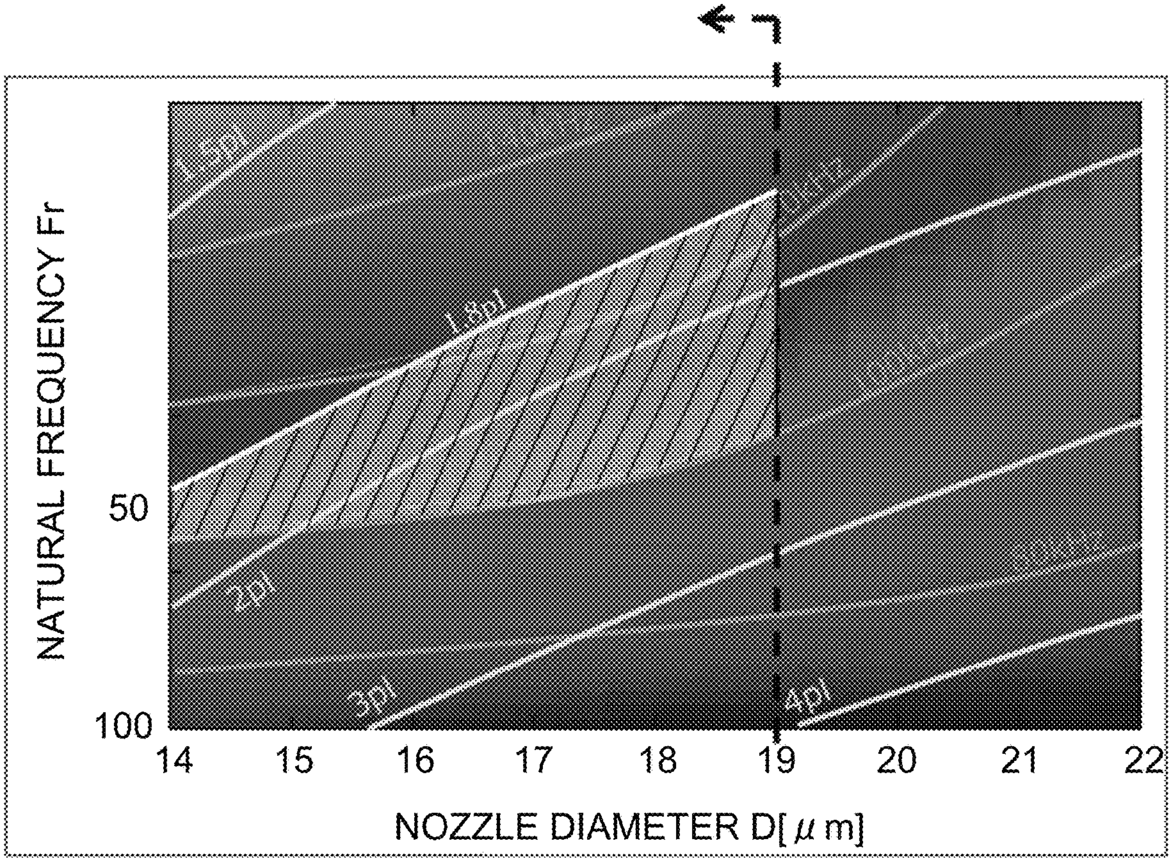
FIG. 9 is a diagram showing the relationship among the diameter D of the nozzle, the natural frequency Fr, the threshold drive frequency, and the volume of an ink droplet.

FIG. 9 is a diagram showing change of the threshold drive frequency (kHz) and the volume (picoliter, pl) of the ink droplet 90 with respect to the diameter D of the nozzle 12N and the natural frequency Fr, based on the table of FIG. 7. In FIG. 9, a gray contour line indicates the threshold drive frequency, and a white contour line indicates the volume of the ink droplet 90.

In FIG. 9, when, at the threshold drive frequency of 120 kHz, the natural frequency is 240 kHz and the diameter D of the nozzle 12N is 18.2 μm, the volume of the ink droplet 90 is approximately 2 pl. When, at the threshold drive frequency of 100 kHz, the natural frequency is 200 kHz and the diameter D of the nozzle 12N is 19.2 μm, the volume of the ink droplet 90 is about 2.5 pl. When, at the threshold drive frequency of 80 kHz, the natural frequency is 150 kHz and the diameter D of the nozzle 12N is 21 μm, the volume of the ink droplet 90 is about 3.5 pl. As described above, it is understood that there is a correlation between the threshold drive frequency, the volume of the ink droplet 90, the natural frequency Fr, and the diameter D of the nozzle 12N.

However, as described above, when the Ohnesorge number Oh is less than 0.2, satellite droplets are likely to be produced. To prevent the satellite droplets, it is preferable that the Ohnesorge number Oh is 0.2 or more, that is, the diameter D is 19 μm or less.

Based on the above analysis results, the head 1 of the printer 100 according to the present embodiment is configured such that the diameter D of the nozzle 12N and the natural frequency Fr, i.e., parameters of the head 1, satisfy the following requirements (1), (2), and (3). The requirement (1) is that the threshold drive frequency≥100 kHz. The requirement (2) is that the volume of the ink droplet 90≥1.8 pl. The requirement (3) is that the Ohnesorge number Oh≥0.2.

In FIG. 9, a range satisfying the requirements (1), (2), and (3) is indicated by hatching.

Thus, parameters of the head 1 to satisfy the above requirements are determined as follows. The threshold drive frequency, the diameter D of the nozzle 12N, and the natural frequency Fr satisfies the following formula (1).

[Formula 1]

$F=(-0.0313\times D+0.905)\times Fr+(2.59\times D-11.9)$, where F (kHz) is the threshold drive frequency, D (μm) is the diameter of nozzle 12N, and Fr (kHz) is the natural frequency of the individual channel 12B.

The volume of the ink droplet 90, the diameter D of the nozzle 12N, and the natural frequency Fr satisfy the following formula (2).

[Formula 2]

$V=(-0.000463\times D-0.00244)\times Fr+(0.298\times D-0.844)$, where V (pl) is the volume of an ink droplet, D (μm) is the diameter of nozzle 12N and Fr (kHz) is the natural frequency of the individual channel 12B.

The above formulas (1) and (2) are derived by the inventors' analysis.

The Ohnesorge number Oh, the diameter D of the nozzle 12N, and the physical properties of the ink satisfy the following formula (3). Physical properties include viscosity, density, and surface tension.

[Formula 3]

$Oh=\mu/(\rho\times\sigma\times D)^{1/2}$, where Oh is Ohnesorge number, μ (mPa·s) is ink viscosity, ρ ($g/m^3$) is ink density, σ (mN/m) is ink surface tension, and D (μm) is the diameter of the nozzle.

Effects of Present Embodiment

As described above, according to the present embodiment, a sufficient amount of ink droplets 90 for recording can be ejected at a high drive frequency by satisfying the requirements (1) and (2). The threshold drive frequency is inversely proportional to the pinch-off time Tp, and as the threshold drive frequency becomes higher, the pinch-off time Tp becomes shorter. Therefore, the pinch-off time Tp obtained by satisfying the requirement (1) in which the threshold drive frequency is equal to or higher than the 100 kHz is a value at which the ink droplets 90 continuously ejected are not connected. Further, by satisfying the requirement (3), the tail 92 of the ink droplet 90 is not separated from the main droplet 91, and a satellite droplet is not generated.

The threshold drive frequency, the diameter D of the nozzle 12N, and the natural frequency Fr according to the requirement (1) satisfy the above formula (1). The volume of the ink droplet 90, the diameter D of the nozzle 12N, and the natural frequency Fr according to the requirement (2) satisfy the above-described formula (2). The Ohnesorge number Oh, the diameter D of the nozzle 12N, and the physical properties of the ink such as viscosity, density, and surface tension according to the requirement (3) satisfy the above formula (3). In this case, it is possible to more reliably realize the configuration of the printer 100 in which the diameter D of the nozzle 12N and the natural frequency Fr satisfy the requirements (1), (2), and (3).

In the present embodiment, the viscosity of the ink has a value falling within a range of 3 to 10 mPa·s, which are general numerical values of the viscosity of the water-based ink and the UV ink. In this case, it is possible to more reliably realize a configuration that matches the analysis conditions of FIG. 8 and satisfies the requirements (1), (2), and (3).

In the present embodiment, the surface tension of the ink has a value falling within a range of 20 to 50 mN/m, which is a general numerical value of the surface tension of the water-based ink and the UV ink. In this case, it is possible to more reliably realize the configuration of the printer 100 in which the analysis conditions of FIG. 8 are satisfied and the diameter D of the nozzle 12N and the natural frequency Fr satisfy the requirements (1), (2), and (3).

In the present embodiment, the density of the ink has a value falling within a range of 0.8 to 1.2 $g/cm^3$, which are general numerical values of the density of the water-based ink and the UV ink. In this case, it is possible to more reliably realize the configuration of the printer 100 in which the analysis conditions of FIG. 8 are satisfied and the diameter D of the nozzle 12N and the natural frequency Fr satisfy the requirements (1), (2), and (3).

As illustrated in FIG. 5, the drive signal is suitable for the "pull-ejection method". In the "pull-ejection method", an ink droplet is ejected from the nozzle 12N by increasing the volume of the pressure chamber 12P from a predetermined volume and then decreasing the volume to a predetermined volume or less. For the drive signal suitable for the "pull-ejection method", a pressure wave is efficiently generated in the individual channel 12B, and a desired amount of ink droplet is ejected with small energy, as compared with a drive signal suitable for the "push-ejection method". In the "push-ejection method", the actuator 13X that is flat in an initial state is deformed to be convex toward the pressure chamber 12P at a predetermined time. This reduces the volume of the pressure chamber 12P, thus ejecting an ink droplet from the nozzle 12N.

The width of the pulse included in the drive signal is equal to AL and half the reciprocal of the natural frequency Fr. In this case, since the ejection speed of the ink droplet 90 is maximum and the pinch-off time Tp is short, high-frequency driving can be achieved.

The actuator 13X is a thin film piezoelectric element. The actuator 13X is thus thin, and sufficiently deformable even if the pressure chamber 12P is small. Therefore, in this case, it is possible to realize the requirement (1) by increasing the natural frequency Fr by reducing the size of the pressure chamber 12P, and to sufficiently deform the actuator 13X.

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the disclosure, and not limiting the disclosure. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described disclosure are below.

Modification

In the above-described embodiment, the electrode constituting the actuator has a two-layer structure including the individual electrode and the common electrode, but may have a three-layer structure. For example, the three-layer structure is a structure including a drive electrode to which a high potential and a low potential are selectively applied, a high potential electrode held at a high potential, and a low potential electrode held at a low potential.

The opening of the nozzle has a substantially circular shape in the above-described embodiment, but may have a rectangular shape. For a square opening of the nozzle, one side of the square is comparable to the diameter D of the nozzle. For a rectangular opening of the nozzle, the length of a short side of the rectangle is comparable to the diameter D of the nozzle.

The head is not limited to a line type and may be a reciprocating type.

The target to which liquid droplets are ejected is not limited to sheet. Examples of the target include a cloth, a substrate, and plastic.

Liquid droplets ejected from the nozzle are not limited to ink droplets. Examples of the liquid droplets include droplets of a treatment liquid for aggregation or precipitation of components in an ink.

The disclosure is not limited to a printer, but is also applicable to a facsimile machine, a copier, and a multifunction peripheral. The disclosure can also be applied to a liquid droplet ejecting device used for applications other than image recording. For example, the disclosure can be applied to a liquid droplet ejecting device that ejects a conductive liquid onto a substrate to form a conductive pattern.

What is claimed is:

1. A liquid droplet ejecting device comprising:

a channel member having a channel, the channel including a nozzle and a pressure chamber communicating with the nozzle; and an actuator on the channel member and configured to apply a pressure to a liquid in the pressure chamber, wherein a diameter of the nozzle and a natural frequency of the channel are parameters of the liquid droplet ejecting device to satisfy that:

(a) the actuator has a threshold drive frequency of 100 kHz or more;

(b) a droplet of the liquid has a volume of 1.8 pl or more; and (c) the Ohnesorge number is 0.2 or more, with the following formulas (1) (2), and (3) satisfied:

$$F=(-0.0313\times D+0.905)\times Fr+(2.59\times D-11.9) \tag{1}$$

wherein F is the threshold drive frequency (KHz), D is the diameter of the nozzle (μm), and Fr is the natural frequency (kHz), $$V=(-0.000463\times D-0.00244)\times Fr+(0.298\times D-0.844) \tag{2}$$

wherein V is the volume of a droplet (pl), D is the diameter of the nozzle (μm), and Fr is the natural frequency (kHz), and $$Oh=\mu\big/(\rho\times\sigma\times D)^{1/2} \tag{3}$$

wherein Oh is the Ohnesorge number, μ is a viscosity of the liquid (mPa·s), ρ is a density of the liquid (g/m$^3$), and σ is a surface tension of the liquid (mN/m).

2. The liquid droplet ejecting device according to claim 1, wherein the liquid has a viscosity having a value falling in a range of 3 to 10 mPa·s.

3. The liquid droplet ejecting device according to claim 1, wherein the liquid has a surface tension having a value falling in a range of 20 to 50 mN/m.

4. The liquid droplet ejecting device according to claim 1, wherein the liquid has a density having a value falling in a range of 0.8 to 1.2 g/cm$^3$.

5. The liquid droplet ejecting device according to claim 1, further comprising a controller configured to apply a drive signal to the actuator, wherein the drive signal is based on a pull-ejection method to eject a liquid droplet from the nozzle by increasing a volume of the pressure chamber from a predetermined volume and then decreasing the volume to the predetermined volume or less.

6. The liquid droplet ejecting device according to claim 1, further comprising a controller configured to apply a drive signal to the actuator, wherein the drive signal includes a pulse having a width, the width being equal to an acoustic length (AL) that is a one-way propagation time of a pressure wave in the channel and being half of a reciprocal of the natural frequency.

7. The liquid droplet ejecting device according to claim 1, wherein the actuator includes a thin film piezoelectric element.

* * * * *